S. G. BAILEY.
APPARATUS FOR RAISING AND LOWERING HANGING SCENERY AND OTHER LOADS.
APPLICATION FILED JULY 6, 1909.

977,499.

Patented Dec. 6, 1910.

S. G. BAILEY.
APPARATUS FOR RAISING AND LOWERING HANGING SCENERY AND OTHER LOADS.
APPLICATION FILED JULY 6, 1909.

977,499.

Patented Dec. 6, 1910.

Witnesses
Otto E. Hoddick
J. D. Thornburgh

Inventor
Seth G. Bailey
By A. J. O'Brien
Attorney

S. G. BAILEY.
APPARATUS FOR RAISING AND LOWERING HANGING SCENERY AND OTHER LOADS.
APPLICATION FILED JULY 6, 1909.

977,499.

Patented Dec. 6, 1910.

Witnesses
Otto E. Hoddick.
J. D. Thornburgh.

Inventor
Seth G. Bailey.
By A. J. O'Brien.
Attorney

S. G. BAILEY.
APPARATUS FOR RAISING AND LOWERING HANGING SCENERY AND OTHER LOADS.
APPLICATION FILED JULY 6, 1909.

977,499.

Patented Dec. 6, 1910.
6 SHEETS—SHEET 6.

Witnesses
Otto E. Hoddick.
J. D. Thornburgh.

Inventor
Seth G. Bailey.
By A. J. O'Brien.
Attorney

UNITED STATES PATENT OFFICE.

SETH G. BAILEY, OF DENVER, COLORADO, ASSIGNOR OF ONE-FOURTH TO MARTIN BECK, OF NEW YORK, N. Y., AND ONE-FOURTH TO ANDREW C. CARSON, OF DENVER, COLORADO.

APPARATUS FOR RAISING AND LOWERING HANGING SCENERY AND OTHER LOADS.

977,499.  Specification of Letters Patent.  Patented Dec. 6, 1910.

Application filed July 6, 1909. Serial No. 506,204.

*To all whom it may concern:*

Be it known that I, SETH G. BAILEY, citizen of the United States, residing in the city and county of Denver and State of Colorado, have invented certain new and useful Improvements in Apparatus for Raising and Lowering Hanging Scenery and other Loads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for raising and lowering hanging scenery and other loads.

In this specification the use of the apparatus for raising and lowering scenery in theaters is specifically considered and must be kept constantly in mind in order that the language employed may be fully comprehended; it must be understood, however, that the invention may be advantageously used for raising and lowering loads in many other relations. Heretofore, so far as I am aware, the general method of handling scenery of this character has been by hand, requiring the work of a considerable number of men, each piece of scenery being raised and lowered, and when properly adjusted, ropes connected therewith, being tied to what is known as a pin rail. Under this system, whenever it is necessary to change the position of a piece of scenery, the ropes must be unwound and the scenery member adjusted by hand.

My present invention belongs to the same class as that disclosed in my previous application #466,307, filed December 7th, 1908 and may be considered an improvement over the said construction.

My present improvement, broadly stated, relates more particularly to mechanism, whereby in case of fire, all of the hanging scenery may be approximately instantly dropped to the floor of the stage, thus placing it in such shape that if it has already become fired, as to smother the fire. It is well known that hanging scenery, in its ordinary condition, for use, is exceedingly susceptible to fire, with the result that only a very short time is required for the entire apparatus behind the scenes to be in flames.

The object of my invention is to prevent difficulties of this character.

My apparatus includes, in common with the construction disclosed in my former application, a series of operating wheels or drums, each of which is connected with the loop of a cable which engages the groove in the drum. Upon opposite sides of these drums, shafts are arranged having their axes parallel with the axes of the drums, the said shafts being caused to rotate toward the drums. Upon these shafts are mounted gears or pinions arranged to be shifted into and out of mesh with a relatively large gear mounted upon each drum. When one gear is in mesh with the gear of the drum, the latter is rotated in one direction; when the other gear is in mesh with the drum gear, the drum is rotated in the opposite direction. The gear of the shafts are alternately thrown into commission with the corresponding drum gear in raising and lowering the scenic members. The general construction, whereby these operations are accomplished, is somewhat similar to that disclosed in my aforesaid previous application. However in my improved construction, provision is made so that by shifting a single lever, brakes, which are employed in connection with the several drums, are simultaneously released, allowing the drums to rotate under the influence of the weight of the hanging scenery, whereby the latter is allowed to fall to the floor of the stage, for the aforesaid purpose.

Having briefly outlined my improved construction, I will proceed to describe the same in detail, reference being made to the accompanying drawing, in which is illustrated an embodiment thereof.

In this drawing: Fig. 5 is an elevation looking in the direction of arrow 5, Fig. 3. In this view, the weighted arms connected with the band brakes are sectionized on the line 5—5 Fig. 3 and the parts are shown on a larger scale than in Figs. 2 to 4.

The same reference characters indicate the same parts in all the views.

Figure 1:
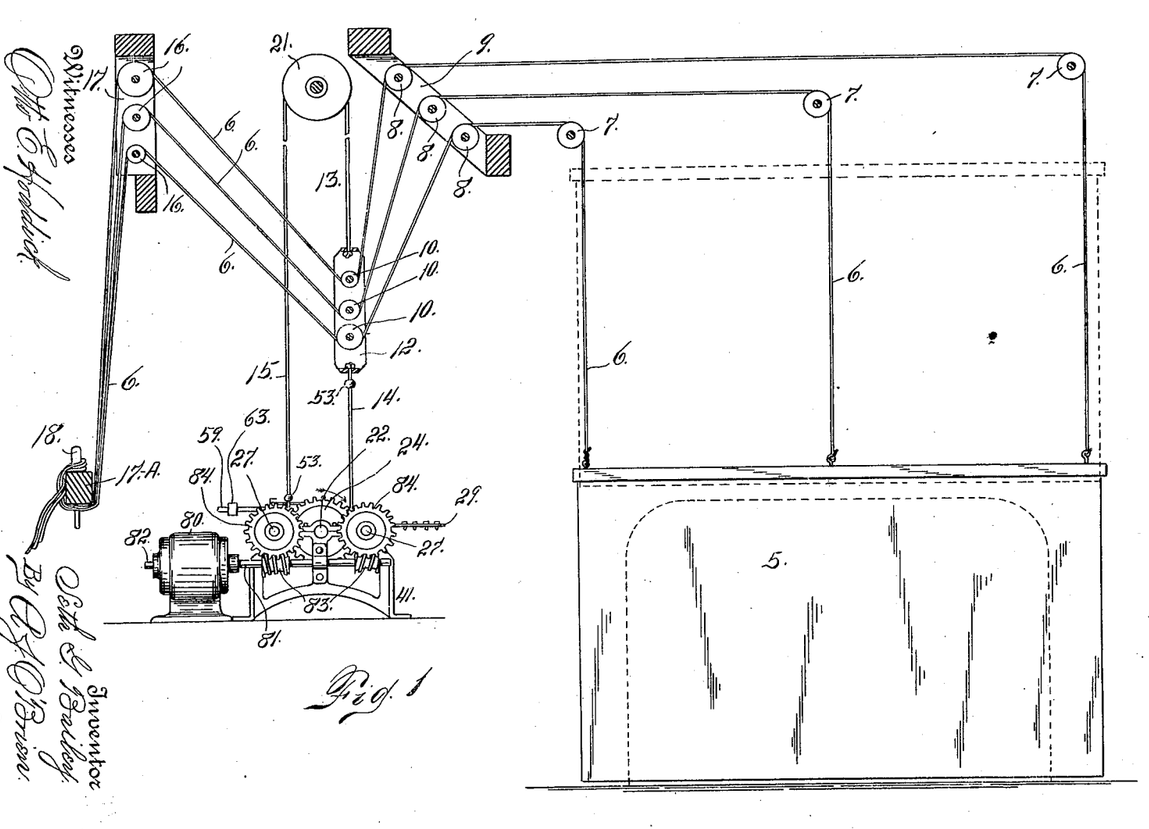
Figure 1 is an elevation, partly in section, illustrating my improved mechanism, for shifting hanging scenery.

Let the numeral 5 designate a scenic member, (see Fig. 1) with which are connected three ropes or cables 6, passing over guide pulleys 7, thence over other pulleys 8 mounted on an inclined support 9, thence over pulleys 10, mounted upon a block 12, interposed in one run of a cable loop 13, whose parallel runs are designated 14 and 15 respectively. After passing through the block 12, in engagement with the pulleys 10, the cables 6 pass over other pulleys 16, mounted upon a stationary block 17, whence they pass downwardly to a pin-rail 17ᴬ, where they are connected with a pin 18.

The cable loop 13, at its lower extremity, engages one of the operating drums or wheels 19, which is provided with a groove 20 for the purpose. The upper extremity of this loop is supported by a guide pulley 21, this pulley being located at a considerable height, to permit the block 12 to move vertically between the pulley and the drum, a sufficient distance for scenery shifting purposes.

The pin-rail is only used in the original adjustment of the scenic member. For instance: the scenic member 5 is first operated by hand and the cables 6 adjusted to cause the curtain to hang in the proper position, that is to say, so that its parallel top and vertical edges are in horizontal planes. The cables are then fastened to the pin-rail, after which the scenic member is manipulated by the use of the operating mechanism, which will now be described.

Loosely mounted on a horizontal shaft 22, is the series of drums 19, there being as many drums as there are pieces of scenery to be shifted. Each of these drums is composed of a part 23, containing a groove 20, and adapted to be engaged by the cable loop 13, the said loop passing underneath the drum and being operated by friction. The drum also is provided with a relatively large gear 24 and a member 25 engaged by a band brake 26.

Arranged on opposite sides of the shaft 22, in the same horizontal plane therewith, and parallel thereto, are two operating shafts 27, each equipped with a number of relatively small gears or pinions 28, which are splined on the shafts and rotate therewith, being arranged, however, to slide freely thereon. There are two gears 28 for each drum, the same being arranged on opposite sides of the drum and adapted to alternately mesh with the drum gear 24 for the purpose of operating the drum in different directions, as is required in raising and lowering the scenic member. It must be understood that each shaft 27 has a series of gears 28 mounted thereon and corresponding in number with the number of drums employed for scenery shifting purposes.

Figure 2:
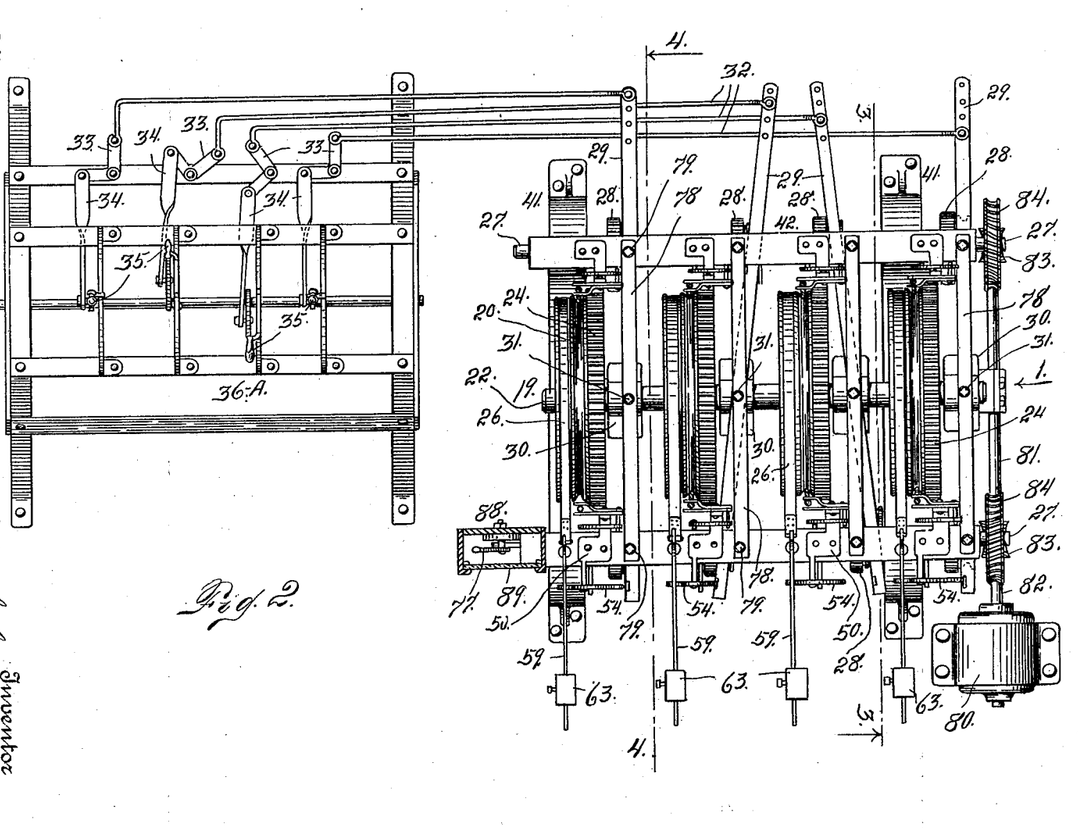
Fig. 2 is a top plan view of the operating mechanism shown on a larger scale, the cables being illustrated in cross section.

Each pair of gears employed in connection with each drum is arranged to be shifted by a lever 29, which is pivoted upon a centrally located bolt 31, mounted on a bearing 30 of the shaft 22. Each of these levers 29 projects outwardly beyond the drum, its free extremity being connected with an operating rod 32, leading to a bell crank lever 33, having one arm connected with a link 34, connected with the operating hand lever 35, mounted upon a suitable frame work 36ᴬ (see Fig. 2). Each lever 29 is provided with a downwardly extending member 36, located on each side of shaft 22, and provided with a pin 37, which enters the groove 38 of the grooved part 39, formed integral with the operating gear 28. The body of the lever is also equipped on each side of the shaft 22 with a similar pin 40, which enters the groove 38 from above, the pin 37 engaging the same from below. By virtue of this arrangement, when the lever 29 is shifted in one direction, to its limit of movement, the gear 28 on one side of the drum is thrown into mesh with the drum gear 24, while the gear 28 on the opposite side is thrown to its limit of movement away from the last named gear. This operation is manually accomplished through the instrumentality of the hand lever and the connections 32 and 33, heretofore explained. The hand lever is initially operated for the purpose of shifting the scenic member, but when once the operating gear 28 is thrown into mesh with the drum gear, for shifting the scenic member, it is automatically disengaged therefrom, when the member is carried to its limit of movement in either direction. The mechanism whereby the said result is automatically accomplished, will now be explained.

The entire operating mechanism is mounted upon a suitable frame work 41, upon which the various boxes for the shafts 22 and 27 are mounted. Extending above the shafts 27 on each side of the machine, is an angle bar 42, upon which is fulcrumed, as shown at 43, a crescent-shaped lever 44, one extremity of which is adapted to engage an upwardly projecting lug 45, mounted upon the lever 29. The opposite extremity of the lever 44 is adapted to be engaged by a pin 46, carried by a lever 47, fulcrumed at 48 on an upwardly projecting lug 49, carried by a horizontal plate 50, secured to the top member of the angle bar 42, by rivets or other suitable fastening devices 51ᴬ. The lever 47 is bifurcated at its forward extremity, where it is composed of two separated parts 51 and 52, adapted to straddle the cable forming either run of the loop.

Each run of the cable is equipped with a stop or enlargement 53, which is too large to pass through the bifurcated extremity of the lever 47. Consequently when this knot engages the lever from above, the lever is actuated to throw its opposite arm or that containing the pin 46, upwardly. This upward movement of the pin 46 acts upon the upper extremity of the crescent-shaped lever 44, whereby its opposite extremity acts upon the lug 45, mounted upon the lever 29, as heretofore explained, to shift the corresponding gear 28 a sufficient distance upon its shaft 27 to disengage the gear 28, from the drum gear 24. When this operation occurs on one side of the drum, the band brake 26 automatically serves to lock the drum against movement in response to the weight of the scenic member, while, when the same operation occurs on the opposite side of the drum, it is necessary to operate the tension device connected with the band brake, whereby the latter is thrown into commission. Hence upon one side of the drum, the frame work is equipped with an additional lever 54, fulcrumed upon a pin 55 formed on one extremity of the plate 50. This lever 54 is angle-shaped, and its longer arm 56 is adapted to engage the stop lug 57, formed upon one extremity of each lever 29, while its opposite or shorter arm 58 is adapted to engage from below, a lever 59 which is connected at one extremity with a movable end 60 of the band brake 26. This lever is fulcrumed, as shown at 61, upon a lug 62, formed on and projecting upward from the top of the angle bar 42, its outer extremity being equipped with an adjustable weight 63, for controlling the tension of the brake band.

Figure 3:
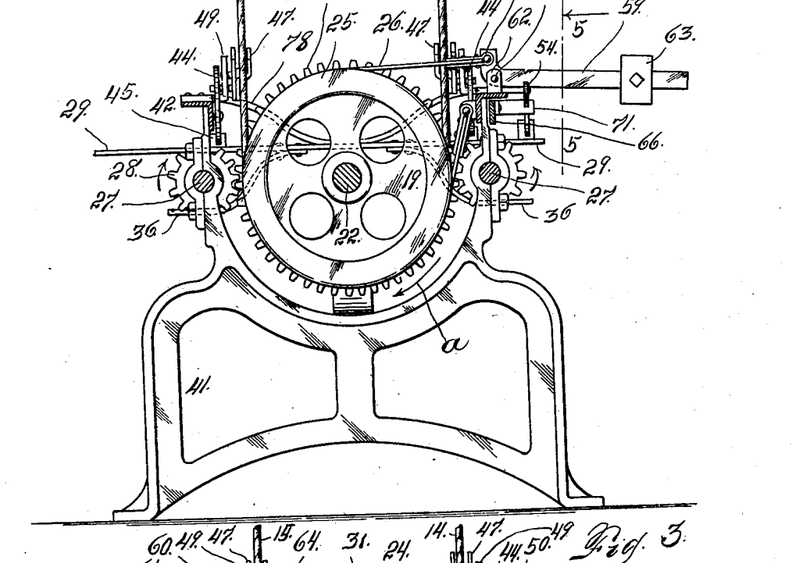
Fig. 3 is a vertical section taken on the line 3—3 Fig. 2, viewed in the direction of the arrow.
Figure 4:
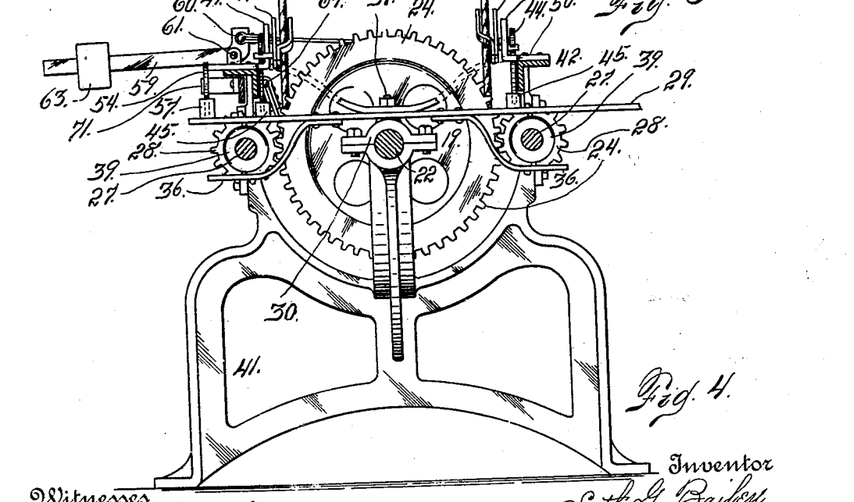
Fig. 4 is a section taken on the line 4—4, Fig. 2, looking in the opposite direction.

The two shafts 27 are so operated that they rotate toward the drum, or as indicated by the arrows adjacent the gears 28 in Fig. 3. Hence, when the shaft on the side of the drum where the weighted lever 59 is located, is employed to operate the drum, the latter is rotating in the direction indicated by the arrow $a$ in Fig. 3, or in a direction which would have a tendency to tighten the brake band upon this member of the drum. Consequently, as soon as the gear 28 is thrown into mesh with the drum on the said side, being the right-hand side, referring to Fig. 3, it is necessary to release the brake band or lift the weighted arm of the lever, whereby the tension of the brake band is relieved, and this is accomplished in the following manner: As the gear 28 is thrown into mesh with the drum gear, the stop 57 on the lever 29 acts upon the free extremity of the arm 56 of the lever 54, and actuates the lever sufficiently to cause the arm 58, which occupies a position beneath the weighted arm of the lever 59, as aforesaid, to lift the said arm whereby the band brake is released, allowing the drum to rotate freely in the proper direction. As soon, however, as the scenic member has been moved to the desired position, the stop 53 upon a corresponding run of the cable loop 13, acts upon the lever 47, causing the latter, through its pin 46, to act upon the crescent-shaped lever 44, whereby the latter, engaging the lug 45, is caused to shift the lever 29 upon its fulcrum, sufficiently to disengage the gear 28 from the drum gear. When this is accomplished, the lug 57, which the lower arm of the lever 54 engages, is carried a sufficient distance to relieve the said lever from pressure sufficiently to allow the weighted arm of the tension lever to move downwardly under the influence of its weight, and apply the band brake in a manner that will be readily understood, thus locking the drum against further movement. The extremity of the band brake remote from that with which the tension lever 59 is connected is fixedly connected with the frame work of the machine, as shown at 64.

Upon the depending member 65 of the angle bar 42, is movably mounted a rod 66, which is concealed from above by the top member 67 of the said angle bar. This rod 66 is connected with the angle bar by bolts 68, passing through slots 69 of sufficient length to permit the necessary movement of the rod upon the bar. This rod is provided at suitable intervals with angle brackets 70, each of which is equipped with an outwardly projecting lug 71, lying in the path of the short arm 58 of the angle lever. There is a lug 71 for each of said levers 54. The rod 66 is so arranged that normally the lugs 71 do not interfere with the operation of the various angle levers, corresponding with the various units, of which the operating mechanism is composed. When, however, it becomes necessary to drop all of the scenery upon the stage, the rod 66 is shifted longitudinally upon the bar 42, sufficiently to cause all of the lugs 71 to act upon the arms 58 of the respective angle levers 54, whereby the said lever arms are raised and the weighted arms of the tension levers 59 lifted sufficiently to release the brake bands of all of the drums, whereby the latter are adapted to rotate under the influence of the weight of the various scenic members, to allow the latter to drop simultaneously to the stage. In the event, however, that any scenic member is being lifted or raised at the time when the emergency rod is actuated, the scenic member will continue its upward movement until the limit is reached, and the stop upon the proper run of the operating cable loop shall act upon its corresponding lever 48, to disengage the operating gear 28, from the corresponding drum gear. As soon as this occurs, this particular scenic member will also fall to the stage for the reason heretofore explained.

For the purpose of shifting the rod 66, a hand lever 72 is fulcrumed at 73 upon a lug 74, formed upon the top of the angle bar 42. The lower extremity of this lever is connected, as shown at 76, with one extremity of the rod 66. The upper arm 77 of this lever is of sufficient length to give the operator the required advantage for easily actuating the rod, whereby all of the angle levers 54 are operated to release the brakes of all of the operating drums in the manner heretofore explained.

In order to strengthen the frame work of the mechanism and connect the angle bars 42 on opposite sides of the machine, a series of bow-shaped bars 78 are employed. The extremities of each of these bars are secured to the angle bars 42 by bolts 79, while their depressed central portions are connected with the journal boxes 31 of the shaft 22, by the bolts 30, which form the fulcrums for the various levers 29. The central portions of these bars engage the respective levers 29 and form a bearing for the upper surfaces of the levers, where the latter are fulcrumed.

As shown in the drawing, a motor 80 (preferably electric) is employed for operating the shafts 27 on the opposite sides of the drum. A worm shaft 81 forms an extension of the armature shaft 82 of the motor. Upon this shaft 81 are formed right and left worms 83, which engage worm wheels 84, fast upon the extremities of the two shafts 27. When the machine is in use, the two shafts 27 are continually in motion, but rotated in opposite directions, as indicated by the arrows in Figs. 1 and 3.

From the foregoing description, the use and operation of my improved mechanism will be readily understood.

Assuming that the scenic members 5 have been properly trimmed or adjusted by the hand manipulation of the cables 6, in connection with the pin rail 17, the operation of the mechanism will be as follows: If we assume that the scenic member 5 is in the down position, or that shown in full lines in Fig. 1, and it is desired to lift the same to the dotted line position in the same figure, the gear 28 upon the right-hand side of the drum (refer to Fig. 1) will be thrown into mesh with the gear 24, of the drum, whereby the latter is rotated in the direction indicated by the arrow, adjacent right-hand gear 27 in Fig. 1. This will operate the corresponding drum to cause the run 14 of the loop 13 to move downwardly until the scenic member 5 has been raised to the proper or dotted line position. As soon as this occurs, the stop 53 upon the run 14 of the cable will engage the corresponding lever 47, and actuate the latter sufficiently to operate the crescent-shaped lever 44 and cause the latter to act upon the lug 45 to automatically shift the lever 29 sufficiently to disengage the gear 28 from the drum gear. As soon as this occurs, the drum will cease to move, since the weight of the hanging scenic member 5 will have a tendency to move the drum in the opposite direction, and this it cannot do because of the band brake, which, while allowing the drum to move freely in one direction, will prevent its movement in the opposite direction. Under the aforesaid circumstances, the band brake is not molested, but remains in its normal operating position, but the drum is nevertheless allowed to rotate in the one direction, since its movement has a constant tendency to release the brake. Now assuming that it is desired to drop the scenic member 5 from the position shown in dotted lines to the position shown in full lines, the corresponding lever 29 will be manually thrown in the opposite direction, whereby the gear 28 on the opposite side of the drum is thrown into mesh with the drum gear, causing the drum to rotate in the opposite direction, whereby the run 15 of the cable loop 13 is caused to move downwardly while the opposite run 14 moves upwardly. This movement allows the scenic member to travel downwardly until it reaches the proper position, its lower edge being in contact or approximately in contact with the floor of the stage. As soon as this occurs, the stop 53 of the run 15 of the cable will engage the lever 47 and operate the latter sufficiently to cause the corresponding lever 44 to act upon the lever 45 of the lever 29 and shift the last named lever to disengage the gear 28 from the drum gear. Simultaneously with this operation, the lug 57 upon the said lever will be moved far enough away from the lower extremity of the long arm of the lever 54, to allow the tension lever 59 to act upon the band brake 26 to stop the movement of the drum. It must be explained that during the operation of throwing the gear 28 into mesh with the drum gear 24, during the last described operation, the stop 57 upon the lever 29, acted upon by the long arm 56 of the lever 54, to lift the short arm 58 and raise the tension lever 59 sufficiently to release the band brake. This is necessary in order that the drum may rotate in the direction last described, since the action of the drum upon the band brake has a tendency to tighten the latter. Now assuming that by reason of a fire, or for any reason whatever, it should be necessary to drop all of the scenery upon the stage, the hand lever 77 will be moved in the direction indicated by the arrow B (see Fig. 6.) whereby the rod 66 will be moved in the direction indicated by the arrow C (see Fig. 6) sufficiently to cause the lugs 71 of the angle brackets 70 to act upon the arms 58 of all of the levers 54, sufficiently to lift the tension levers 59 of the band brakes of the entire series of drums, thus allowing all of the drums to rotate freely upon the shaft 22, whereby all of the scenery is allowed to fall upon the floor of the stage, as heretofore explained.

Attention is called to the fact that whenever the lever 29 is manually actuated to throw one of the gears 28 into mesh with the corresponding gear of the drum, the gear 28 on the opposite side of the drum is thrown a considerable distance away from the drum gear, whereby when the meshing gear is automatically disconnected from the drum gear, and the scenic member has reached its limit of movement in either direction, the movement of the lever 29, which corresponds in degree with the movement of the meshing gear, is only actuated sufficiently to throw the meshing gear entirely free from the drum gear, thus bringing the lever 29 into an approximately intermediate position between two adjacent drums, this position being such that both of the gears 28, corresponding with the large gear of any drum, are disconnected from the drum gear. Hence, it will be understood that the gears 28 are automatically disconnected from the drum gear but manually connected therewith, the lever 29 being actuated in each case, the manual operation, however, serving, while it throws one gear 28 into mesh with the drum gear, to throw the opposite gear 28 far away from the drum gear, since the two gears 28 are connected with the lever 29 on opposite sides of the fulcrum point of the latter.

Since the emergency lever 77 and the rod 66, actuated thereby, are only used for emergencies, or on special occasions, it is desirable that this lever should be concealed to prevent unauthorized persons from tampering therewith, since it would be dangerous to the people upon the stage to have the scenery suddenly dropped unawares. To this end, the emergency lever (see Fig. 2) is inclosed by a casing 88, which completely surrounds it. On one side this casing is provided with a glass plate 89, which is sealed and must be broken in order to gain access to the lever. Whenever it is desired to operate the lever in the case of fire or other emergency, the glass plate must be broken in order to gain access to the said lever.

Figure 5:
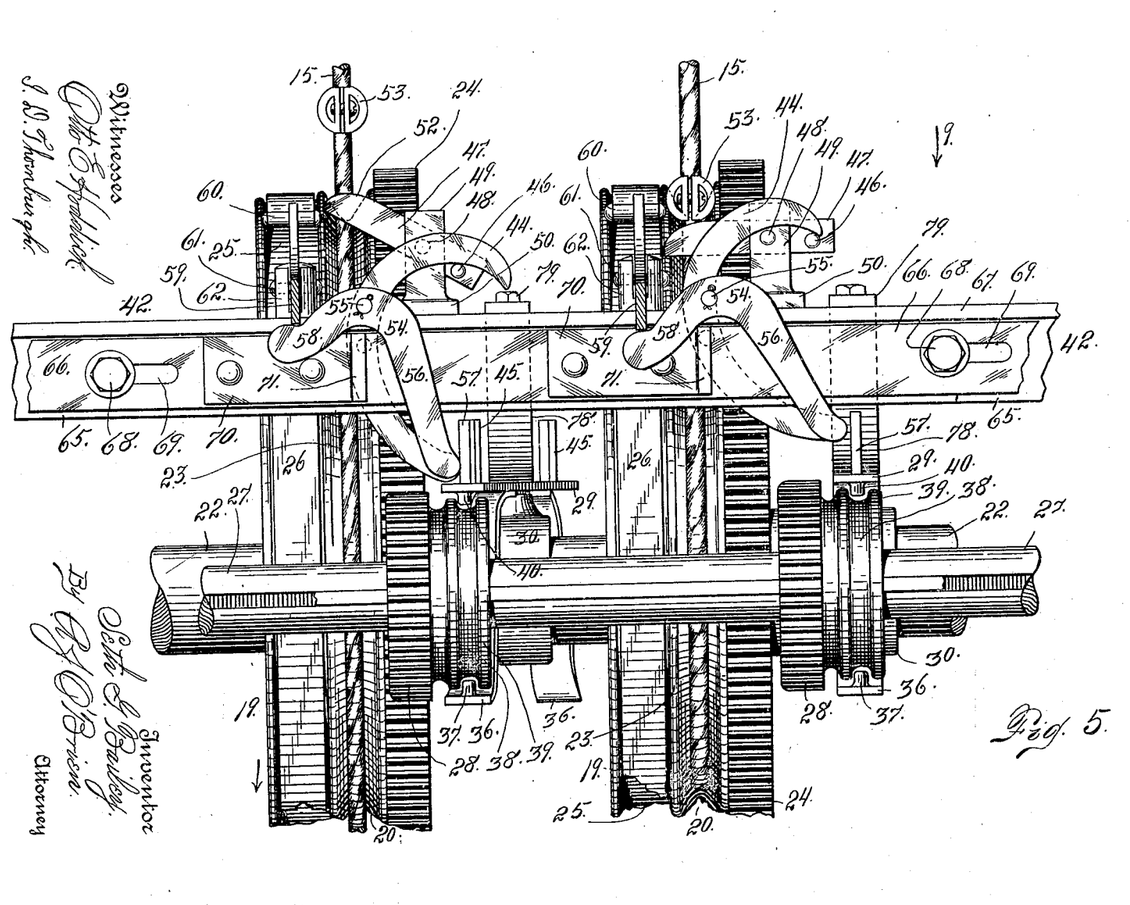
Figures 6, 7:
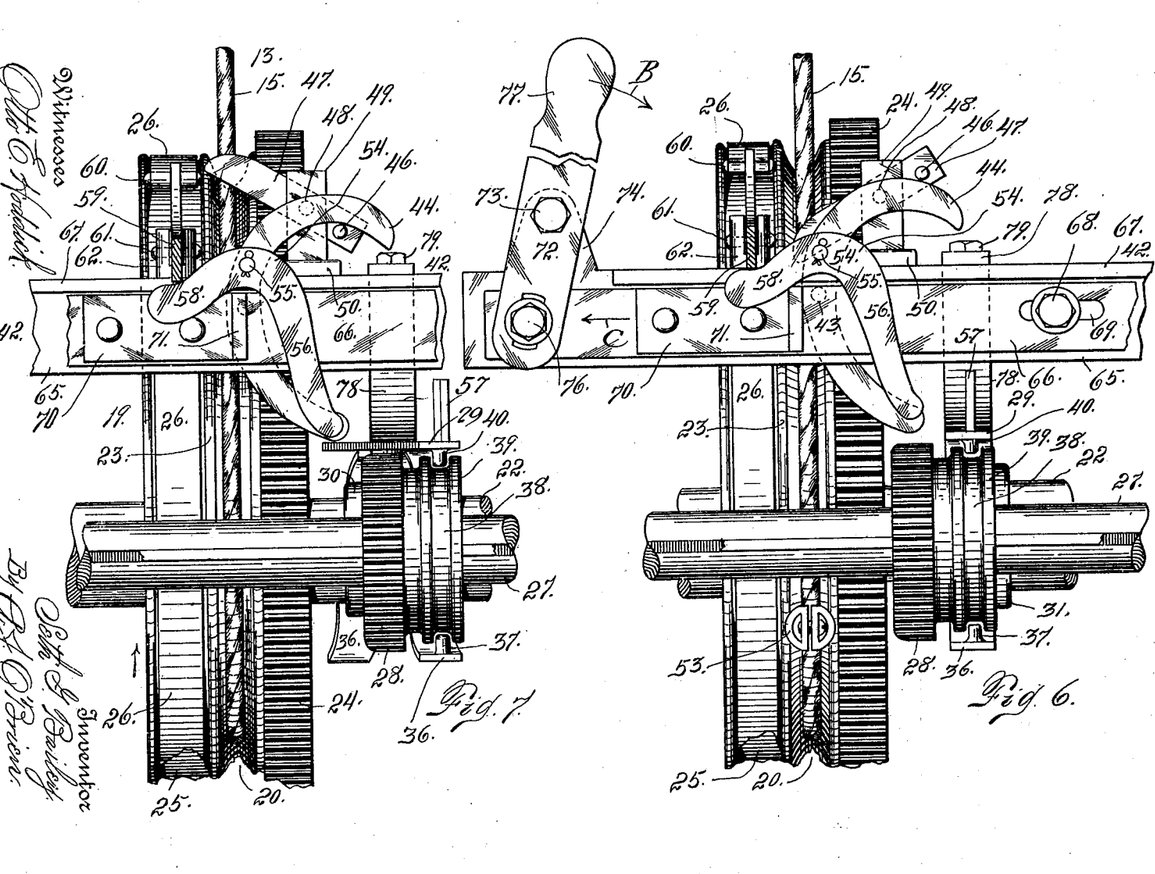
Fig. 6 is a view similar to the left half of Fig. 5, showing the parts in different relative positions. In this view, one of the end drums is illustrated and the emergency lever disclosed, which is employed when it is necessary to drop all of the scenery.
Fig. 7 is a similar view, showing the parts in a different relative position, the bar upon which the emergency lever is mounted being broken away. Said lever, therefore, is not disclosed in this view.
Figure 8:
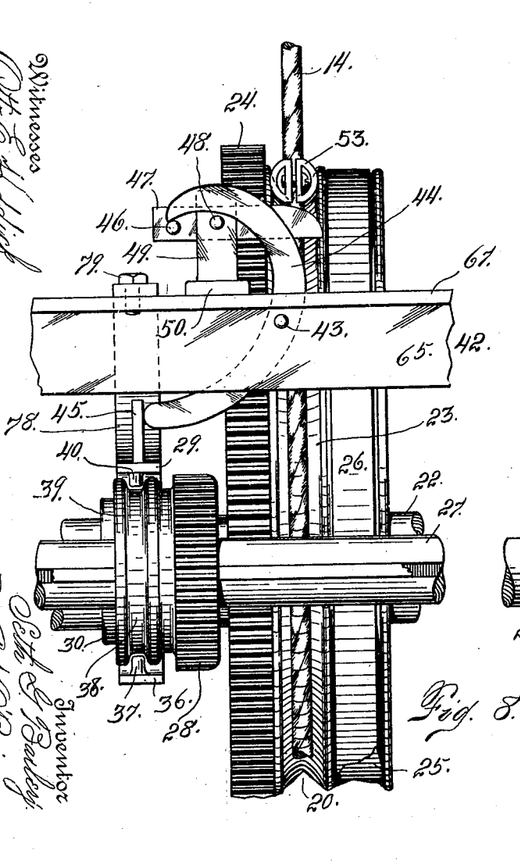
Fig. 8 is a view similar to Fig. 6, but looking at the drum and its attachments from the opposite side.
Figure 9:
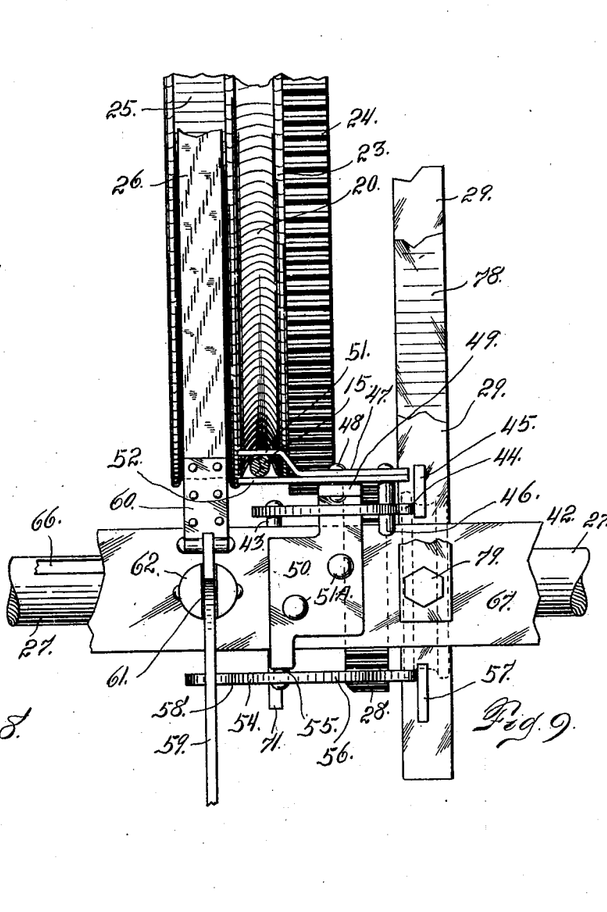
Fig. 9 is a fragmentary top plan view of the construction shown in Fig. 6, the cable being shown in section, and the automatic operating levers in different relative positions.

When the emergency lever 77 is operated (as shown in Fig. 6) to cause all of the scenery to drop upon the stage, the run 15 of the cable loop 13 (see Figs. 1 and 6) will continue to move downwardly after its stop 53 has moved the lever 47 from the position shown at the left of Fig. 5 to the position shown at the right of Fig. 5. The horizontal position, or that shown at the right of Fig. 5 for the lever 47, is the position which this lever assumes after it has been acted on by the stop 53 to cause the lever 44 to engage the stop 45 whereby the lever 29 is operated to disengage the gear 28 from the drum gear 24. When, however, an emergency arises necessitating the use of the lever 77, whereby the rod 66 is shifted to cause the arms 58 of the levers 56 to lift the weighted arms 59 of the band brakes whereby all the drums of the apparatus are released, to allow all of the scenery to fall upon the stage, the run 15 of the cable loop 13 will continue to move downwardly, whereby the lever 47 will be thrown to the position shown in Fig. 6 or to such a position as to allow the stop 53 to pass downwardly to the position shown in the last named figure. In this event the projection 46 will occupy a position above the lever 44, as shown in said figure.

Having thus described my invention, what I claim is:—

1. The combination with a member, of an operating drum, a cable connected in operative relation with the drum and the member, means for operating the drum, means for automatically disconnecting the operating means from the drum, when the member has reached its limit of travel in either direction, a brake for locking the drum against movement when the operating means is disconnected therefrom, and means for manually releasing the brake to allow the drum to rotate and the member to fall upon the stage after reaching its limit of movement in either direction, said means including a rod slidably mounted and provided with a pin, and a lever actuated by the pin.

2. The combination with a number of members, of operating drums, corresponding in number therewith, cables connected in operative relation with the respective drums and the members, adjustable means for operating the drums, and means for automatically disconnecting the operating means from any drum independently of the other drums, when the member has reached its limit of movement in either direction, a separate brake for each drum, and means for simultaneously releasing the brakes of all the drums, to allow all of the members to fall.

3. The combination with a member, of an operating drum, a cable connected in operative relation with the drum and with the member, an adjustable gear for operating the drum, means for manually shifting the gear, whereby the latter is thrown into operative relation with the drum, means for automatically disconnecting the gear from the drum, a brake connected with the drum, and means for releasing the brake to allow the member to fall when it has reached its limit of movement in either direction, said means including a rod slidably mounted and provided with a pin, and a lever actuated by the pin.

4. The combination with a movable member, of a drum, a cable connected in operative relation with the drum and with the member, a brake for controlling the movement of the drum, and means for manually releasing the brake to allow the drum to rotate and the member to fall, said means including a rod slidably mounted and provided with a pin, and a lever actuated by the pin.

5. The combination with a movable member, of an operating drum, a cable connected in operative relation with the drum and with the member, a brake for controlling the movement of the drum, a tension device connected with the brake, and means acting on the tension device to release the brake to allow the drum to rotate and the member to fall, said means including a rod slidably mounted and provided with a pin, and a lever actuated by the pin.

6. The combination with a movable member, of an operating drum, a cable connected in operative relation with the drum and with the member, a brake for controlling the movement of the drum, one extremity of the brake being fixed, a tension device connected with the other extremity of the brake, and means acting on the tension device to release the brake, said means including a manually operated lever, a rod connected in operative relation with the lever and provided with a pin, and a second lever actuated by the pin.

7. The combination with a movable member, of an operating wheel or drum, a cable connected in operative relation with the drum, and with the member, a band brake for controlling the movement of the drum, one extremity of the brake being fixed, a tension device connected with the other extremity of the drum, and means acting on the tension device to release the drum, including a rod slidably mounted, a hand lever, connected in operative relation with the rod, and a second lever actuated by the movement of the rod and acting directly upon the tension device, substantially as described.

8. The combination with a series of movable members, of operating wheels or drums, cables connected in operative relation with the respective drums, and with the members, brakes for controlling the movement of the respective drums, and a single initially-operated device connected to simultaneously release the brakes of all the drums, to allow the latter to rotate, in response to the weight of the members connected therewith.

9. The combination with a series of movable members, of operating wheels or drums, corresponding in number with the members, cables connecting the respective drums in operative relation with the members, a separate brake for each drum, each brake being equipped with a tension device, and means for simultaneously releasing the brakes of all the drums, including a manually operated lever, a rod slidably mounted, and connected in operative relation with the lever, and a series of levers acted on by the said rod and arranged to act on the respective tension devices, to release the brakes of all the drums, substantially as described.

10. The combination with a series of movable members, of a number of operating drums, corresponding with the number of members, cables connecting the respective members in operative relation with the drums, brakes applied to the respective drums, and means for simultaneously releasing the brakes of all the drums, including a single operating lever, and suitable connections between the said lever and the brakes of all the drums, substantially as described.

11. The combination with a series of members, of operating drums, corresponding in number with the members, cables connecting the respective members in operative relation with the several drums, means for operating each drum, means for manually connecting the drum-operating means with the drum, means for automatically disconnecting the operating means from each drum, when the member has reached its limit of movement in either direction, brakes applied to the various drums and means for simultaneously releasing all of the brakes, including a single, manually operated lever, connected in operative relation with the brakes, substantially as described.

12. The combination with a movable member, of an operating drum, a cable engaging the drum in operative relation, adjustable means for operating the drum, and means for automatically disconnecting the operating means from the drum, including a lever acted upon by the cable when the member has reached its limit of movement in either direction and connected in operative relation with the operating means, the said lever being provided with a pin, and a second lever acted on by the said pin of first named lever.

13. The combination with a movable member, of an operating drum, a cable connecting the member in operative relation with the drum, an operating gear slidably mounted, the drum being provided with a gear, means for manually connecting the operating gear with the drum gear, and means for automatically disconnecting the two gears when the member has reached its limit of movement in either direction, including a lever, directly acted upon by the cable, the said lever having a projection and a second lever actuated by the said projection of first named lever, substantially as described.

14. The combination with a movable member, of an operating drum, a cable connected in operative relation with the drum, an operating gear, slidably mounted, the drum being provided with a gear, a manually operated lever, connected with the slidable gear, and adapted to connect the latter in operative relation with the drum gear, means for automatically disconnecting the operating gear from the drum gear, including a lever acted on by the cable and provided with a projection, a second lever, actuated by the said projection of the first named lever and connected in operative relation with the slidable gear, a brake connected with the drum, and means for automatically releasing the brake, when the operating gear is connected with the drum gear, including an auxiliary lever, actuated by the movement of the manually operated lever.

15. The combination with a movable member, of a drum, a cable connected in operative relation with the drum, the latter being provided with a gear, an operating gear adjustably mounted, a manually operated lever connected with the operating gear to shift the latter into mesh with the drum gear, means for automatically disconnecting the operating gear from the drum gear, when the member has reached its limit of movement in either direction, a brake connected with the drum gear, and means for releasing the brake, when the operating gear is moved to connect it with the drum gear, said means including an auxiliary lever, and a pin mounted on the manually operated lever, and adapted to engage the auxiliary lever.

16. The combination with a movable member, of an operating drum, provided with a gear, gears slidable on opposite sides of the drum and rotating in different directions, a lever centrally fulcrumed between the two gears and connected to throw either gear into operative relation with the drum gear, means for automatically disconnecting either gear from the drum gear, when the member has reached its limit of movement in either direction, the said means being mounted on opposite sides of the drum, each means including a lever directly acted on by the lever, and a second lever actuated with the first named lever, a brake connected with the drum, and means located on one side of the drum for automatically disconnecting the brake from the drum, when the operating gear is connected with the drum gear on the same side of the drum.

17. The combination with a movable member, of an operating drum, equipped with a gear, gears slidably mounted on opposite sides of the drum, and rotating in different directions, a manually operated lever connected to actuate both gears, the lever being fulcrumed intermediate the gears, whereby the latter are moved in opposite directions, as the lever is actuated, means located on opposite sides of the drum for automatically disconnecting the gears from the drum gear, when the member has reached its limit of movement in either direction, a brake connected with the drum, and means for automatically releasing the brake when the operating gear is connected with the drum gear on the corresponding side of the drum.

18. The combination with a movable member, of an operative drum, a cable connecting the member in operative relation with the drum, the drum being provided with a gear, gears slidably mounted on opposite sides of the drum, and rotating in opposite directions, a lever connected with both operating gears, the said lever being fulcrumed between the gears, whereby its actuated gears are shifted in opposite directions, the movement of the lever being sufficient to connect one of the operating gears with the drum gear, and means located on opposite sides of the drum, for automatically disconnecting the meshing gear from the drum gear, as the member reaches its limit of movement in either direction, a band brake connected with the drum, a weighted arm connected with the free end of the said brake, and an auxiliary lever acted on by the first named lever, for lifting the weighted arm and releasing the brake when the operating gear on the corresponding side of the drum is connected in operative relation with the drum gear.

19. The combination with a movable member, of an operating drum, operating means adjustably mounted on opposite sides of the drum, means for shifting either operating means into operative relation with the drum, means located on opposite sides of the drum, for automatically disconnecting the operating means from the drum, when the member has reached its limit of movement in either direction, a brake connected with the drum, and means located on one side of the drum for automatically releasing the brake, when the operating means on the corresponding side of the drum is connected with the latter.

20. The combination with a movable member, of an operating drum, a cable connected in operative relation with the drum, operating means adjustably located on opposite sides of the drum, means for shifting the operating means into operative engagement with the drum on either side of the machine, for moving the drum in opposite directions, means located on opposite sides of the drum for disconnecting the operating means therefrom when the member has reached its limit of movement in either direction, a brake connected with the drum, means located on one side of the drum for automatically releasing the brake when the operating means is thrown into operative engagement with the drum on the corresponding side of the machine, and means for setting the brake when the last named operating means is disconnected from the drum.

21. The combination with a movable member of an operating drum, a cable connected in operative relation with the wheel and with the member, means for locking the drum against movement, and means for manually releasing the locking means to allow the drum to rotate, including a rod slidably mounted and provided with a lug, and a lever actuated by the lug.

22. The combination with a series of movable members, of operating drums corresponding in number with the members, cables connecting the respective drums in operative relation with the members, a separate locking device for each drum, and means for simultaneously releasing the locking devices of all the drums, including a rod slidably mounted and provided with lugs, levers operated by the lugs on the rod, and means for operating the rod.

23. The combination with a movable member, of an operating drum, an endless cable loop engaging said drum, a pulley engaged by and forming a support for the loop, a block carried by one run of the loop and equipped with pulleys, flexible devices connected with the member and engaging the pulleys of the loop block, a stationary device with which the extremities of the flexible devices are connected, and pulleys mounted on a stationary support and located on opposite sides of the loop for guiding the flexible devices connected with the member for the purpose set forth.

24. The combination with a series of movable members, of operating drums, cables connected in operative relation with the respective drums and with the members, devices for automatically locking all of the drums against movement in a direction to allow the members to fall, an emergency lever and an operative connection between the said lever and the locking devices of all the drums, whereby the movement of the lever simultaneously releases all of said locking devices and allows the drums to rotate freely in response to the weight of the members, for the purpose set forth.

In testimony whereof I affix my signature in presence of two witnesses.

SETH G. BAILEY.

Witnesses:
P. J. EDWIN ROBINSON,
JESSIE HOBART.